US012668005B2

(12) United States Patent (10) Patent No.: US 12,668,005 B2
Cordier et al. (45) Date of Patent: Jun. 30, 2026

(54) EXTRUSION DEVICE

(71) Applicant: AISAPACK HOLDING SA, Vouvry (CH)

(72) Inventors: Laurent Cordier, Liry (FR); Benoit Hamm, Châlons-en-Champagne (FR); Etienne Hermant, Châlons-en-Champagne (FR); Jean-Manuel Massey, Prunay (FR); Francky Seneuze, Courtisols (FR)

(73) Assignee: AISAPACK HOLDING SA, Vouvry (CH)

( * ) Notice: Subject to any disclaimer, the term of this patent is extended or adjusted under 35 U.S.C. 154(b) by 91 days.

(21) Appl. No.: 18/726,499

(22) PCT Filed: Jan. 9, 2023

(86) PCT No.: PCT/IB2023/050149
§ 371 (c)(1),
(2) Date: Jul. 3, 2024

(87) PCT Pub. No.: WO2023/131912
PCT Pub. Date: Jul. 13, 2023

(65) Prior Publication Data
US 2025/0178254 A1 Jun. 5, 2025

(30) Foreign Application Priority Data
Jan. 10, 2022 (EP) .................................... 22150745

(51) Int. Cl.
*B29B 7/84* (2006.01)
*B29C 45/00* (2006.01)
(Continued)

(52) U.S. Cl.
CPC ...... *B29C 45/0441* (2013.01); *B29C 45/0005* (2013.01); *B29C 45/045* (2013.01);
(Continued)

(58) Field of Classification Search
CPC ..... B29B 7/84; B29C 45/0441; B29C 45/045; B29C 45/13; B29C 45/23; B29C 45/4005;
(Continued)

(56) References Cited

U.S. PATENT DOCUMENTS

| | | | | |
|---|---|---|---|---|
| 3,826,477 A | * | 7/1974 | Kunogi | B29C 45/62 |
| | | | | 425/203 X |
| 4,828,778 A | * | 5/1989 | Gelsomini | B29C 48/12 |
| | | | | 264/297.3 |
| 5,454,995 A | * | 10/1995 | Rusconi | B29C 45/54 |
| | | | | 425/557 |

FOREIGN PATENT DOCUMENTS

| | | | | |
|---|---|---|---|---|
| AU | 615676 B2 | * | 10/1991 | B29C 45/06 |
| DE | 10118486 A1 | | 10/2002 | |

(Continued)

OTHER PUBLICATIONS

International Search Report for PCT/IB2023/050149 dated May 4, 2023, 4 pages.
(Continued)

*Primary Examiner* — Leo B Tentoni
(74) *Attorney, Agent, or Firm* — NIXON & VANDERHYE

(57) ABSTRACT
The device for implementing the method comprises an extruder (10) supplied with a material, at least a first cylinder (11) and a second cylinder (12), at least a first mould (13) and a second mould (13'), a circuit (14) connecting the extruder to the cylinders and the cylinders to the moulds, and means for extraction (18, 19, 19') of the moulded item.

16 Claims, 2 Drawing Sheets

(51) Int. Cl.

| | |
|---|---|
| *B29C 45/04* | (2006.01) |
| *B29C 45/13* | (2006.01) |
| *B29C 45/23* | (2006.01) |
| *B29C 45/40* | (2006.01) |
| *B29C 45/62* | (2006.01) |
| *B29C 45/73* | (2006.01) |
| *B29C 45/76* | (2006.01) |
| *B29C 45/54* | (2006.01) |
| *B29K 23/00* | (2006.01) |
| *B29K 105/12* | (2006.01) |

(52) U.S. Cl.
CPC .............. *B29C 45/13* (2013.01); *B29C 45/23* (2013.01); *B29C 45/4005* (2013.01); *B29C 45/62* (2013.01); *B29C 45/73* (2013.01); *B29C 45/76* (2013.01); *B29C 2045/545* (2013.01); *B29K 2023/00* (2013.01); *B29K 2105/12* (2013.01)

(58) Field of Classification Search
CPC ... B29C 2045/545; B29C 45/62; B29C 45/73; B29C 45/76

USPC ..... 264/297.3, 297.6, 328.8, 328.11, 328.16, 264/328.19; 425/145, 203, 552, 555, 556, 425/557, 564, 576, 585, 587, 588
See application file for complete search history.

(56) References Cited

FOREIGN PATENT DOCUMENTS

| | | | |
|---|---|---|---|
| FR | 2403359 | A1 | 4/1979 |
| FR | 2428518 | A1 | 1/1980 |
| FR | 2612831 | A1 | 9/1988 |
| WO | 8902816 | A1 | 4/1989 |

OTHER PUBLICATIONS

Written Opinion of the ISA for PCT/IB2023/050149 dated May 4, 2023, 8 pages.

* cited by examiner

EXTRUSION DEVICE

CROSS-REFERENCE TO RELATED APPLICATIONS

This application is the U.S. national phase of International Application No. PCT/IB2023/050149 filed Jan. 9, 2023 which designated the U.S. and claims priority to EP patent application Ser. No. 22/150,745.2 filed Jan. 10, 2022, the entire contents of each of which are hereby incorporated by reference.

TECHNICAL FIELD

The invention relates to a device (also referred to as an "extrusion machine" below) and to a method for transforming a thermoplastic synthetic material, for example but without limitation unsorted thermoplastic synthetic materials from various different sources, into a 2D or 3D item (also referred to as an "article"), wherein the synthetic material is mixed in a sleeve comprising a screw member, is rendered fluid, is moulded, is cooled in the mould and is extracted from this mould in the form of an item. The invention also relates to a product obtained by the method described in the present application.

An extrusion device is disclosed for example in patent application FR 2 428 518.

Publication FR 2 612 831 discloses an extruder, the extruded material from which is supplied continuously, either at an outlet or at another outlet of a distributing member which is followed by a moulding machine having two concentric barrels of moulds which are set sequentially facing one of these two outlets and then the other at an injection station, while other moulds are set at an injection station for the moulded articles, so that this machine has a small overall size and a high production capacity.

Publication DE 101 18 486 discloses an injection molding machine, with melt accumulators are located between the plasticizing unit and piston injection unit. Each accumulator has inlets fed by valve-free lines which connect the accumulators to each other and to the plasticizing unit. Each accumulator has a piston which closes off the inlets as it moves forward to drive melt into the piston injection unit. In an injection molding machine, melt accumulators are located between the plasticizing unit and piston injection unit. Each accumulator has inlets fed by valve-free lines which connect the accumulators to each other and to the plasticizing unit. Each accumulator has a piston which closes off the inlets as it moves forward to drive melt into the piston injection unit.

SUMMARY OF THE INVENTION

One aim of the invention is to improve the known devices and methods.

Another aim of the present invention is to propose a device and a method for manufacturing articles or items, for example but not exclusively from synthetic materials. Typically, but not exclusively, the material used to supply the extruder comprises ground material and/or pellets and/or flakes. Within the context of the present application, any of these expressions may be used, as equivalents and without limitation, to define the raw material used.

More specifically, one of the aims of the present invention is in particular to propose a method and a device allowing continuous operation and uninterrupted manufacture of items in a mould. In an extrusion device, like that of the present invention, it is important for the extruded material to have a permanent flow, despite the fact that the flow supplies successive moulds, and for the extrusion to continue when a mould is being changed, because a stoppage can, for example, block the device and result in downtime. It is therefore sought to optimize cycle times and prevent interruptions which can be time consuming and detrimental to the operation of the device.

In the context of the present invention and according to embodiments of the invention, a production unit making it possible to supply a constant flow rate of extruded material has been developed.

The production unit according to the invention makes it possible to use flakes which, in bulk, have a low density (generally referred to as apparent density or bulk density). To supply flakes to the extruder, the production unit is preferably equipped with a forcing system having several functions:

To supply flakes to the extruder (without them flowing under the effect of gravity)

To increase the apparent density of the flakes by compacting so as to ensure a constant and high flow rate.

Thanks to the forcing system, flakes having an apparent density of less than 0.3 may be used to manufacture items having a density generally between 0.8 and 2.

The device according to the invention, in one mode of implementation, makes it possible to independently dispense several sources of materials, which makes it possible to adjust the properties of the item manufactured. According to one embodiment, the supply device is made up of a number of supply systems coupled to weighing apparatus which define the percentage of the various sources of materials. The flakes coming from different sources are then mixed and subsequently compacted in the forcing system before being supplied to the extruder.

The device according to the invention also makes it possible to add fibres in a controlled quantity together with the flakes coming from the sources selected, so as to increase the rigidity of the parts produced by the device. This addition in the production unit may be carried out in the extruder at the screw inlet or alternatively in the middle or at the end of the screw. The fibres are for example glass fibres, plant fibres (hemp, etc.), cotton fibres or another equivalent material, etc.

In the context of the present invention, a production unit making it possible to keep the extruded material under controlled pressure, so as to prevent uncontrolled degassing in the extrusion screw, in the transfer/injection cylinders or in the supply channels, has been developed. Thus, according to the present invention, the device makes it possible to prevent degassing of the extruded material, or alternatively to carry out partial or total degassing of the extruded material.

In the context of the present invention, use is preferably made of two transfer/injection cylinders connected to the extruder by a supply channel and associated with a valve system for converting the continuous flow of material supplied by the extruder into a discontinuous flow of molten material injected into the moulds. According to the invention, the two cylinders work alternately; the first cylinder injecting the material into the mould while the second is filled, and vice versa.

In the context of the present invention, one mould is supplied at a time, each mould being filled by a single same supply channel which limits the stagnation of molten material in the supply channels. The invention is characterized in particular by movable moulds arranged on a barrel- or carousel-type rotary system. In the context of the invention, the moulds are preferably cooled by immersion in a tank full of water (or another suitable liquid), the temperature of which is regulated. The invention makes it possible to use simple moulds that are easy to produce, and therefore inexpensive.

In the context of the present invention, the moulds slide on a distribution plate comprising at least a hole for injection ("injection point") and a hole for ejection of the moulded item. While the item is cooling in the cavity of the mould, the distribution plate keeps the cavity closed. More specifically, and as will be explained in more detail in the description below, the distribution plate determines both the opening of a mould during the injection of material, the closure of the moulds during the cooling phase and the opening of a mould again for the ejection of the moulded item.

There is thus a single injection point for all of the moulds instead of individual injection for each mould. Also provided is a single closure means (namely the distribution plate) for all of the moulds in the cooling phase instead of an individual closure means for each mould.

The invention will be understood more clearly following the description of a number of embodiments of the invention and the figures attached to the present application illustrate the method and the machine.

In embodiments, the invention relates to a device for the moulding of 2D or 3D items, the device comprising at least one extruder supplying a first cylinder and a second cylinder, a rotary barrel comprising a plurality of moulds, the device further comprising a distribution plate that is fixed relative to the barrel and common to all of the moulds and having an injection point for supplying a mould and an ejection hole for extracting a moulded item from a mould, the cylinders alternately filling a mould of the barrel via the injection point, the barrel being rotated by one indexed interval when the mould is full, the moulds being closed off sealingly by the distribution plate between the position of injection and the position of extraction of the item formed.

In embodiments, the moulds located between the injection point and the ejection hole and closed off by the distribution plate are preferably cooled in a cooling area.

In embodiments, the moulds are cooled by immersion in a bath of liquid.

In embodiments, the part of the distribution plate located in the cooling area is cooled.

In embodiments, the injection hole is connected to the cylinders by a supply channel.

In embodiments, a shutter nozzle closes off the supply channel during rotation of the barrel.

In embodiments, the cylinders are supplied by the extruder preferably with uninterrupted operation.

In embodiments, the extruder comprises at least one screw rotating constantly.

In embodiments, the extruder comprises at least one decompression area, the area being used preferably for removing moisture from the product and/or introducing fibres or fillers into the extruded material.

In embodiments, the device comprises an ejector associated with each mould.

In embodiments, the position of the ejector is used to measure the level of filling of the mould.

In embodiments, the device comprises a forcing system for increasing the density of the material introduced into the extruder.

In embodiments, the injection pressure is lowered to approximately 100 bar after injection during rotation of the barrel relative to the distribution plate.

In embodiments, the invention relates to a method for manufacturing 2D or 3D items wherein the following steps are performed:

material is supplied from one or more sources in the form of flakes, the proportion of material as a function of its source being predetermined, for example as a function of the item being manufactured;

the flakes are mixed, preferably compacted, and then introduced into an extruder;

optionally, a material, such as fibres, is added, at the inlet of the extruder and/or in the middle of the screw and/or at the end of the screw;

the material is extruded;

the extruded material is introduced into a first injection cylinder of a pair of injection cylinders working alternately;

the material is injected from a second injection cylinder of said pair of injection cylinders into a movable mould arranged in a rotary system with several moulds, through an injection point passing through a distribution plate that is fixed relative to the rotary system;

the mould is closed by rotating said rotary system, by means of the distribution plate on which said system slides;

the moulds of the rotary system are cooled during rotation of said system;

a moulded item is extracted via an extraction point passing through the distribution plate.

In embodiments, the invention relates to a 2D or 3D item obtained by the method and the device as described in the present application.

BRIEF DESCRIPTION OF THE DRAWINGS

FIG. 1 shows the device as a whole and FIG. 2 shows a view of the barrel and of the distribution plate on each side of the distribution plate.

REFERENCE NUMERALS

Figure 1:
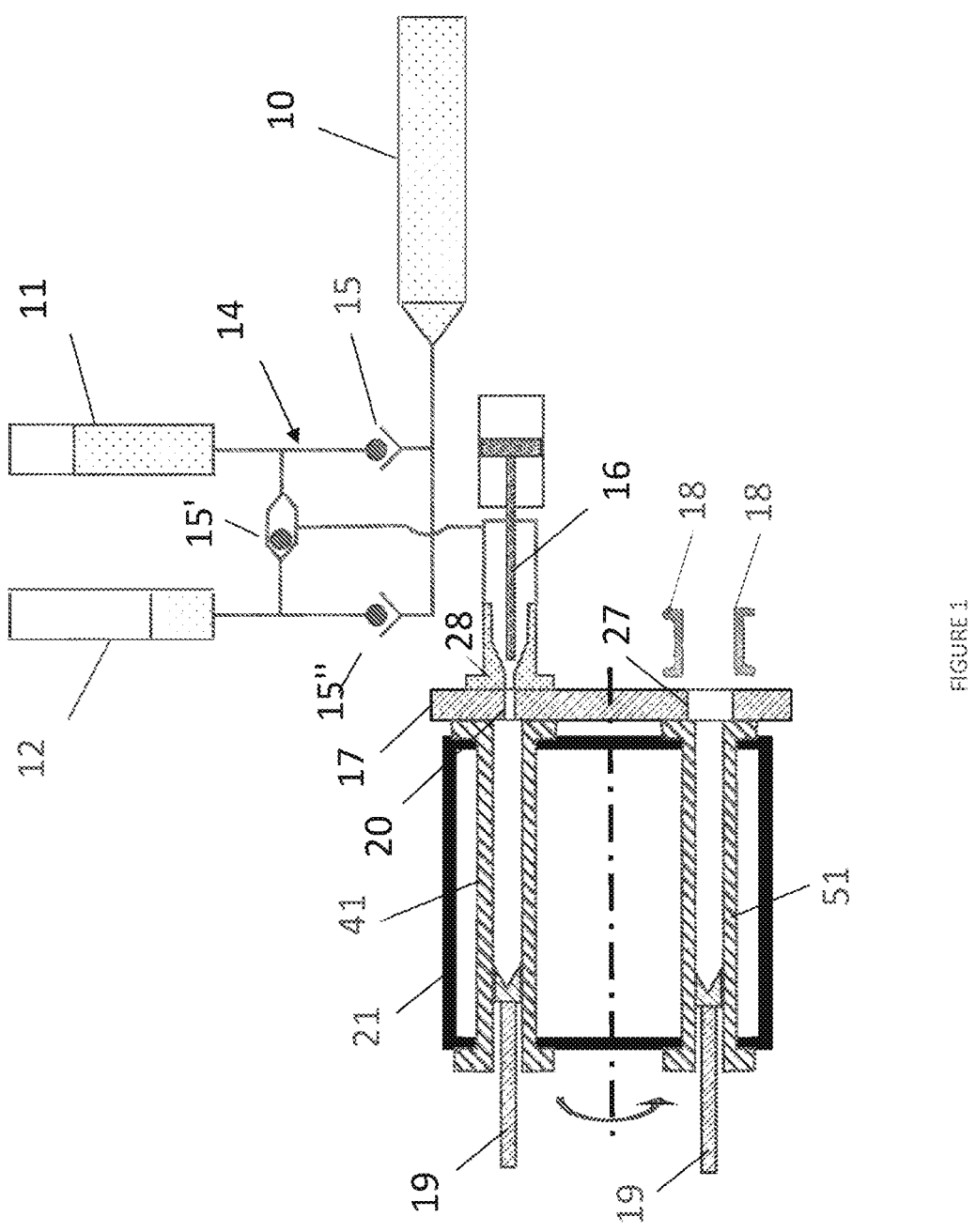
FIGS. 1 and 2 schematically show the device according to the invention.

10: extruder
11: injection cylinder
12: injection cylinder
14: circuit
15: valve
15': valve
15": valve
16: shutter
17: distribution plate
18: extractor
19: ejector piston
20: injection hole
21: barrel
22: injection position
23: cooling position
24: ejection position
25: intermediate position
26: critical area
27: ejection hole
28: injection nozzle
31: injected material
41 to 52: moulds
41: mould in the injection position
42-50: moulds in the cooling position
51: mould in the ejection position 52: mould in the intermediate position
53: direction of rotation of the barrel

DETAILED DESCRIPTION

The invention makes it possible to dispense the raw material in the form of flakes coming from different sources, to incorporate fillers such as fibres and, lastly, to obtain a homogeneous and compacted mixture with a density of greater than 0.6 and preferably greater than 0.8. Thus, the production unit according to the invention makes it possible to use and to mix materials from different sources packaged in bulk in the form of flakes. Each source may be characterized in terms of level of cleanliness, thermoplastic resin content, filler content, etc. By combining materials from several sources, and with the optional addition of additives or fillers, the final properties of the item produced by the method according to the invention may be optimized (rigidity, impact resistance, aging).

The production unit according to the invention has, upstream of the extruder, dispensing means suitable for the different sources of materials, means for obtaining a homogeneous mixture, and lastly means for cramming the mixture in order to increase the apparent density of the flakes at the inlet of the extruder.

A preferred dispensing device consists of a conveyor belt equipped with weighing means and mixer. A weighing precision of less than 3% is obtained, and preferably less than 1%. Precise control of the formulation is thus obtained. The dispensing means also comprise a filtration system making it possible to separate out steel elements with a diameter of greater than 2 mm and preferably greater than 1 mm, which could damage the extrusion screws or block the valves. The filtration system is preferably magnetic.

An example of an alternative dispensing device is a gravimetric batch hopper dispensing unit. This type of system makes it possible to dispense 4 sources of material(s) and has a dispensing precision of less than 3% and preferably less than 1%. However, the flow of the material in the hoppers is sometimes limited by the shape factor of the flakes, which limits the use of these devices.

The device according to the invention preferably comprises a mixer apparatus such as a hopper, or silo mixer, with a blade, helix or screw. This apparatus also makes it possible to disperse fillers, such as fibres or mineral fillers, that may have been added. Alternatively, the mixer apparatus is a ribbon mixer. The mixer element makes it possible to obtain a homogenous mixture of the flakes coming from different sources of materials, and of the fillers, such as glass fibres, hemp fibres or the like.

The mixer element is connected to a cramming device making it possible to increase the apparent density of the mixture of materials in the form of flakes. The cramming device is preferably equipped with a "forcing" screw which compacts the material at the inlet of the extruder.

According to a first embodiment of the invention, which is the preferred embodiment, the functions of dispensing, mixing and cramming are performed by three different devices placed in series.

According to a second embodiment of the invention, the functions of mixing and cramming are performed by a single device.

According to a third embodiment of the invention, the functions of dispensing and mixing are performed by a single device.

According to a fourth embodiment of the invention, the functions of dispensing, mixing and cramming are performed by a single device.

Optionally, the dispensing, mixing or cramming devices are also used for drying the material.

Figure 2:
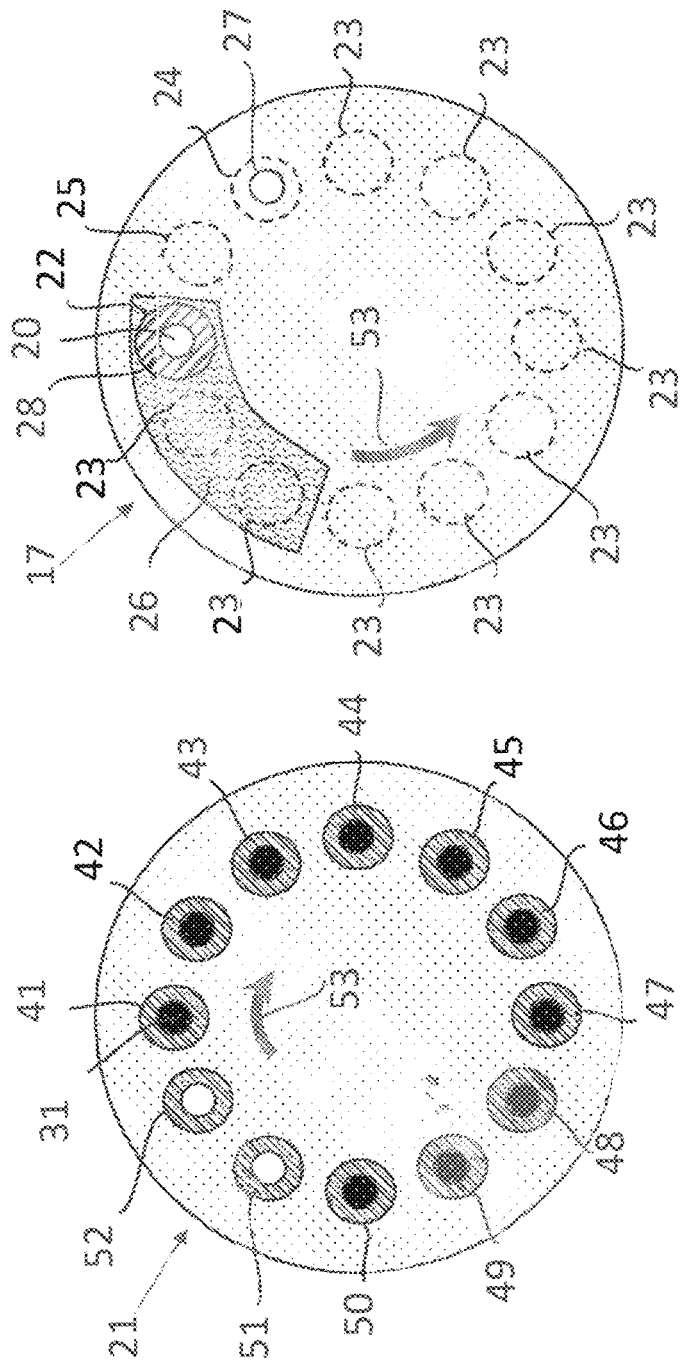

One aspect of the invention is that it allows a high rate of production of items obtained from ground materials. FIGS. 1 and 2 depict a device for this purpose and its operation.

The device according to the invention comprises the dispensing, mixing and cramming device described above and connected to the extruder 10 of the extrusion device shown in FIG. 1. This extrusion device is connected to two injection cylinders 11 and 12 operating alternately, in other words one is filled while the other injects the material into the mould and vice versa. A system of three valves 15, 15' and 15" and a shutter 16 allows uninterrupted rotation of the screw and simultaneous injection-moulding of the items. A system of moulds 41 to 52 arranged on a rotary barrel 21 allows the production of solid parts with a long cooling time without thereby penalizing the mass flow rate of the parts produced.

The operation of the device according to the invention is described in detail below.

FIG. 1 shows a machine according to one mode of implementation of the invention. The machine preferably comprises an extruder 10. Such an extruder makes it possible to take in and melt flakes coming from materials of very varied origin, composition, shape and cleanliness; to mix the material more thoroughly so as to render same as homogeneous as possible, it does not damage fillers and additives such as glass fibres and does not damage fillers such as natural fibres, for example added at the end of plasticization. Such an extruder may include decompression areas for partially or fully degassing the material, or for incorporating additives such as mineral fillers like fibres or talc, or such as dyes or such as antioxidants or such as slip or demoulding agents, or such as polymerization or cross-linking agents. The extruder 10 makes it possible to obtain a high flow rate of material.

The screw profile is suitable for processing products with solid particles. Shearing of these screws is limited to prevent damage to the fibres.

The machine thus comprises the first injection cylinder 11 and the second injection cylinder 12 for injecting the material into the moulds 41-52 via a circuit 14 comprising the closure valves 15, 15', 15". The device includes a number of moulds 41-52 arranged on the barrel 21, this number being greater than 4 and preferably greater than 6. According to the invention, the number of moulds on the barrel 21 is optimized as a function of the maximum flow rate of the extruder and the cooling time for the item. Thus, the number of moulds on the barrel 21 is optimized for production at the optimum mass flow rate of the facility. Therefore, the invention allows production at a substantially constant mass flow rate regardless of the volume of the item manufactured.

The system of three valves 15, 15' and 15" allows in tandem operation of the injection cylinders 11 and 12 jointly with continuous rotation of the extrusion screw delivering a constant flow rate. The valves 15 and 15" according to the invention are single action valves allowing the molten material to pass through only in the direction from the extruder towards the associated injection cylinder 11 or 12, respectively. The valve 15' according to the invention is a double action valve allowing the molten material to pass through only in the direction from the injection cylinder 11 towards the mould in a first position, and only in the direction from the injection cylinder 12 towards the mould in a second position. According to a preferred embodiment of the invention shown in FIG. 1, the valves 15, 15' and 15" are controlled by the relative pressure generated by the extruder 10, the cylinder 11 and the cylinder 12. Thus, when the pressure generated by the cylinder 11 is greater than the pressure generated by the extruder 10 which is greater than the pressure generated by the cylinder 12, then the valve 15" opens and the valve 15 closes and the valve 15' allows the material coming from the cylinder 11 to pass through towards the mould. Thus, this pressure configuration causes a first flow of material from the extruder 10 to the cylinder 12 (filling of the cylinder 12) and also a second flow of material, if the shutter 16 is open, from the cylinder 11 to the mould 13 (filling of the mould). A symmetrical configuration is obtained when the pressure generated by the cylinder 12 is greater than the pressure generated by the extruder 10 which is greater than the pressure generated by the cylinder 11. In this case, the cylinder 11 is filled while the cylinder 12 injects the material into the mould. Pressure control of the valves 15, 15', 15" is advantageous as it is very robust and allows the flow of material which is highly charged and homogeneous as regards the dimension of the fillers. Preferably, the valves 15, 15' and 15" are ball valves.

An alternative device consists in using valves 15 and 15" controlled on opening such as piston valves.

The shutter 16 makes it possible to connect the injection device to the cavity of the mould when the mould is in the injection position. Conversely, when the mould is in the movement phase owing to the rotation of the barrel, the shutter 16 is closed and shuts off the injection channel of the moving barrel.

The distribution plate 17 is a fixed part of the device which ensures the transition between the hot part of the machine (injection device) and the cold part (barrel with the moulds). According to the invention, the moulds 41-52 slide on the distribution plate 17 during rotation of the barrel 21. Thus, depending on the angular position of a mould relative to the distribution plate, this mould is successively in the injection position (the distribution plate has a hole for the passage of the material through the injection point 20); then in the cooling position (the distribution plate obstructs the injection point 20 and closes off the cavity of the mould); then in the ejection position (the distribution plate has a hole for the ejection of the moulded item in the form of a profile). These different functions of the distribution plate 17 are made possible by the fact that the distribution plate 17 is fixed and that it is therefore the rotation of the barrel 21 that will place a mould in the correct position for injection, cooling or extraction of the moulded item.

Preferably, the distribution plate 17 undergoes a surface treatment to preserve surface hardness and allow sliding of the barrel 21. The treatment may for example be tempering, nitriding etc. or another equivalent treatment.

Consequently, the pressures in particular between the distribution plate 17 and the barrel 21 that will allow, on the one hand, injection without dripping of the material while at the same time allowing relative rotation between the distribution plate 17 and the barrel 21 without the material leaking from the filled mould 41, are defined according to embodiments of the present invention. Non-limiting examples are given below.

The moulds according to the invention are arranged in a barrel 21 preferably filled with water. Thus, there may be for example twelve moulds 41-52 arranged in the barrel. Upon each rotation of $1/12$ of a revolution of the barrel 21, one mould is in the injection position, one mould is in the ejection position and the other ten moulds are in the cooling position. The advantages of moulds 41-52 arranged in a barrel 21 are multiple. The moulds 41-52 are very simple as they are cooled by immersion in the tank of the barrel 21 (no cooling circuit per mould). The barrel 21 and the moulds 41-52 form an assembly that may be changed very quickly on the machine. The time required to change a mould is therefore much reduced. It is also easy to increase or reduce the number of moulds on the barrel 21. Thus, for parts which are twice as small, there may be 24 moulds instead of 12 in the barrel. The optimization of the number of moulds in the barrel 21 makes it possible to use the device to its maximum extrusion capacity. Preferably, the number of empty moulds in the barrel will thus be limited, for example to one mould between ejection and injection.

The machine also comprises an extractor 18 and ejector pistons 19 for each mould 41-52.

The embodiments of the invention are distinguished from the prior art in particular by virtue of the following:

The extruded material arrives via a single injection point 20 which is fixed and passes through the distribution plate 17. It is the moulds 41-52 that move (preferably by rotating) so as to be positioned facing the injection point 20 in order to be filled each in turn. The number of moulds is not limited, for example so as to be equal to the number of cylinders, but is independent. The moulds are placed in a barrel 21 which rotates and places each mould 41-52 of said barrel 21 successively before the fixed injection point 20. By virtue of this structure, the cooling time for the moulded article has no impact on the work rate of the machine and its operation may be optimized. The cycle of the machine only depends on the injection time and the time necessary to lower the pressure in the mould and allow the rotation of the barrel 21 so as to bring the next free mould 41-52 before the injection point 20.

The mould 41-52 for injection-moulding a part consists of a movable part (the barrel 21 comprising the moulds 41-52 per se) and a fixed part (the distribution plate 17 with the injection point 20).

According to the invention, preferably, the distribution plate 17 is cooled, which makes it possible to set the threshold of the injected material 31 in the mould and facilitates the relative movement between the barrel 21 and the distribution plate 17.

The cooling means are for example a water circuit arranged in the distribution plate along the path travelled by the moulds.

According to the present invention, the position of the ejectors 19 may be used to measure the level of filling of the moulds 41-52. To be specific, when the mould is full, the pressure in the mould increases rapidly beyond the injection pressure, which leads to the formation of drips at the inlet of the mould on the same side as the injection point. Therefore, by measuring the position of the ejector 19 it can easily be determined when the mould is full (or at least nearly full) and thus prevent a sudden increase in pressure in the mould and the creation of said drips, by controlling the injection pressure, for example by stopping injection or reducing the injection pressure as a function of the state of filling.

FIG. 2 shows an example of a barrel 21/distribution plate 17 pair. In this FIG. 2, the left-hand drawing is a view of the distribution plate from the side of the moulds 41-52 (left-hand side of the plate 17 in FIG. 1) and barrel 21, and the right-hand drawing is a view of the distribution plate 17 from the other side, i.e. the same side as the injection nozzle 28 (right-hand side of the plate 17 in FIG. 1). FIG. 2 shows the barrel 21 comprising twelve moulds (41 to 52) and also shows the distribution plate 17 associated with the barrel 21. FIG. 2 shows the face of the barrel which slides against the face of the distribution plate. The arrow 53 indicates the direction of rotation of the barrel 21 relative to the distribution plate 17, which is fixed.

The mould 41 of the barrel is shown in the injection position, in other words facing the position 22 on the distribution plate. In position 22 the distribution plate has a hole 20 for the passage of the injected material 31, and an injection nozzle 28 which is pressed against the wall of the barrel during filling to prevent any leak of material between the distribution plate and the barrel. According to the invention, all of the moulds 41 to 52 are filled via the same injection hole 20.

The moulds 42 to 50 of the barrel are shown in the cooing phase, in other words facing the positions 23 on the distribution plate. In the cooing positions 23, the distribution plate jointly forms the wall of several moulds (moulds 42 to 50 in FIG. 2). Another particular feature of the invention is linked to the fact that the moulds are in relative movement in relation to the distribution plate 17. Thus, the moulds 41-50 according to the invention are characterized by the fact that one of their walls slides against the distribution plate 17 while remaining sealed, while the item is cooling in the cavity.

The mould 51 of the barrel is shown in FIG. 2 in the ejection position 24 of the distribution plate shown in FIG. 2. In this position, the cooled item is removed from the cavity via the ejection hole 27 of the distribution plate by the extractor 18. The section of the ejection hole 27 is greater than or equal to the section of the item, considered perpendicularly to the axis of ejection. According to the invention, preferably, all of the items are ejected from the moulds via the same hole 27.

The mould 52 shown in FIG. 2 is in the intermediate position 25 on the distribution plate 17, between the ejection position 24 and the injection position 22. The cavity of the mould 52 is empty, ready for the next injection.

The barrel 21 is driven with an indexed rotary movement. The angular interval in degrees depends on the number of moulds fitted on the barrel and is equal to 360° divided by the number of moulds. Thus, in the example shown in FIG. 2, the barrel including 12 moulds rotates by 30 degrees per interval. Thus, during the next rotary movement, not shown, the mould 41 will move into the cooling position 23, the mould 50 will move into the ejection position 24, the mould 51 will move into the intermediate position 25 and the mould 52 will move into the injection position 22.

As can be understood from the figures described, one of the benefits of using the two cylinders 11, 12 is that when the machine is in production, the system operates without interruption, despite the mould changing: as one of the cylinders is being emptied while a mould is being filled, the other cylinder is being filled in anticipation of the next mould to be filled, and when the mould changes, the supply cylinder changes. The machine thus operates continuously with no downtime.

Moreover, the machine is not limited to twelve injection moulds as shown by way of example in the figures, and it may include more or less than twelve moulds in a barrel 21. For example, the machine may include eight moulds, or even twenty-four moulds in a barrel 21.

The machine affords a number of advantages, in particular:

A forcing screw may be used to fill the extruder 10. This screw makes it possible to increase the density of the material and guarantees a higher extruder rate.

Each mould is filled independently.

The parts injection-moulded according to the method are finished (no additional operation).

The valves 15, 15', 15" make it possible to rotate the extruder at low pressure and to injection-mould the product at high pressure.

The mould is not closed off on the injection side. It is the shutter 16 which initially closes off the mould, then the mould is closed by the distribution plate 17 during rotation of the barrel 21.

The moulds move by sliding on a wall which is common to all of the moulds, referred to as the distribution plate 17. This relative movement between the moulds and the distribution plate 17 makes it possible to change the configuration of the moulds according to the operation to be performed in the injection cycle. Thus, the distribution plate 17 has at least the following three configurations:

During the filling and compacting operation, the distribution plate 17 has a hole 20 for the passage of the injected material 31.

During the cooling operation, the distribution plate 17 shuts off the mould.

During the operation of ejection of the item, the distribution plate 17 has a hole 27 for the passage of the item.

According to embodiments of the invention, the invention relates to a method for manufacturing 2D or 3D items and to items obtained by this method. In the method, at least the following steps are carried out:

material is supplied from one or more sources in the form of flakes, the proportion of material as a function of its source being predetermined, for example as a function of the item being manufactured;

the flakes are mixed, preferably compacted, and then introduced into an extruder;

optionally, a material, such as fibres, is added, at the inlet of the extruder and/or in the middle of the screw and/or at the end of the screw;

the material is extruded;

the extruded material is introduced into a first injection cylinder of a pair of injection cylinders working alternately;

the material is injected from a second injection cylinder of said pair of injection cylinders into a movable mould arranged in a rotary system with several moulds, through an injection point passing through a distribution plate that is fixed relative to the rotary system;

the mould is closed by rotating said rotary system, by means of the distribution plate on which said system slides;

the moulds of the rotary system are cooled during rotation of said system;

a moulded item is extracted via an extraction point passing through the distribution plate.

The system comprises for example a barrel with a number of moulds, such that on each rotation of the barrel by one interval (the interval depends on the number of moulds), one mould is in the injection position, one mould is in the position of ejection (or extraction) of the item and the majority, if not all, of the other moulds are in the cooling position. In certain configurations, it is possible for one mould (at least) to remain empty for one or several intervals of rotation of the barrel, depending on the distance between the positions of injection and of extraction and on the interval of rotation. This mould is therefore empty after extraction and does not become filled until it reaches the injection position.

One of the advantages of the method is that the cycle time is divided by a factor of the order of 15 relative to known methods for solid parts.

Another advantage of the method is that the parts produced have a good surface appearance, smooth and without shrink marks.

The embodiments described in the present application are presented by way of illustrative examples and must not be considered to be limiting. Other embodiments may make use of means equivalent to those described for example. The embodiments may also be combined with one another according to the circumstances, or means used in one mode may be used in another mode. For example, the raw materials used may be materials based mainly on polyolefin mixed with other materials. The plastic content is around 90 to 40% by volume approximately and preferably the ground material is not sorted beforehand. The extruder may be a twin screw extruder (e.g. with two counter-rotating screws) or another suitable extruder.

The invention claimed is:

1. A device for the molding of two-dimensional (2D) or three-dimensional (3D) items, said device comprising:
    at least one extruder;
    a first cylinder;
    a second cylinder, said at least one extruder supplying said cylinders;
    a rotary barrel comprising a plurality of molds; and
    a distribution plate that is fixed relative to the barrel and common to all of the molds and having
        an injection point configured to supply one of the molds, and
        an ejection hole configured to extract a molded item from the mold,
    wherein said first and second cylinders are configured to alternately fill one of said molds of the rotary barrel via said injection point, said rotary barrel being rotated by one indexed interval when said mold is filled, said molds being closed off sealingly by the distribution plate between the position of injection and the position of extraction of the item formed.

2. The device according to claim 1, wherein the molds disposed between the injection point and the ejection hole and closed off by the distribution plate are cooled in a cooling area.

3. The device according to claim 1, wherein the molds are cooled by immersion in a bath of liquid.

4. The device according to claim 1, wherein the part of the distribution plate disposed in the cooling area is cooled.

5. The device according to claim 1, wherein the injection point is connected to said cylinders by a supply channel.

6. The device according to claim 5, wherein a shutter nozzle closes off the supply channel during rotation of the barrel.

7. The device according to claim 1, wherein the cylinders are supplied by the extruder with uninterrupted operation.

8. The device according to claim 1, wherein the extruder comprises at least one screw rotating constantly.

9. The device according to claim 1, wherein the extruder comprises at least one decompression area configured to one or more of: (i) remove moisture from the product and (ii) introduce fibers or fillers into the extruded material.

10. The device according to claim 1, further comprising an ejector associated with each of the molds.

11. The device according to claim 10, wherein the position of the ejector is used to measure the level of filling of the mold.

12. The device according to claim 1, further comprising a forcing system configured to increase the density of the material introduced into the extruder.

13. The device according to claim 1, wherein the injection pressure is lowered to approximately 100 bar after injection during rotation of the barrel relative to the distribution plate.

14. A method for manufacturing two-dimensional (2D) or three-dimensional (3D) items, the method comprising:
    supplying a first material from one or more sources in the form of flakes, a proportion of material as a function of its source being predetermined as a function of the item being manufactured;
    mixing the flakes, and then introducing the mixed flakes into an extruder;
    extruding the first material;
    introducing the extruded material into a first injection cylinder of a pair of injection cylinders working alternately;
    injecting the introduced material from a second injection cylinder of said pair of injection cylinders into a movable mold disposed in a rotary system with several molds, through an injection point passing through a distribution plate that is fixed relative to the rotary system;
    closing the mold by rotating said rotary system, by the distribution plate on which said system slides;
    cooling the molds of the rotary system during rotation of said system; and
    extracting a molded item is extracted via an extraction point passing through the distribution plate.

15. The method according to claim 14, further comprising adding a second material one or more of: (i) at the inlet of the extruder, (ii) in the middle of a screw of the extruder, and (iii) at the end of the screw, after the mixed flakes are introduced into the extruder,
    wherein the second material is extruded before introducing the extruded material into the first injection cylinder.

16. The method according to claim 15, wherein the second material comprises fibers.

* * * * *